United States Patent Office 3,410,825
Patented Nov. 12, 1968

3,410,825
BIS[p - (2,3 - EPOXYPROPOXY)PHENYL]POLY-
CYCLIC SATURATED HYDROCARBONS
AND SYNTHETIC RESINOUS POLYETHERS
THEREOF
Harry W. Coover, Jr., and Richard L. McConnell, Kings-
port, Tenn., assignors to Eastman Kodak Company,
Rochester, N.Y., a corporation of New Jersey
No Drawing. Continuation-in-part of application Ser. No.
480,774, Aug. 18, 1965. This application Feb. 27, 1967,
Ser. No. 619,035
The portion of the term of the patent subsequent to
Jan. 17, 1984, has been disclaimed
13 Claims. (Cl. 260—47)

ABSTRACT OF THE DISCLOSURE

New compounds are provided having the formula:

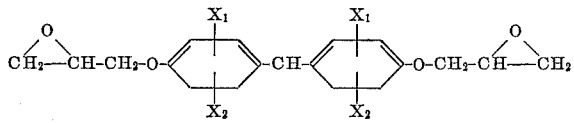

or the formula:

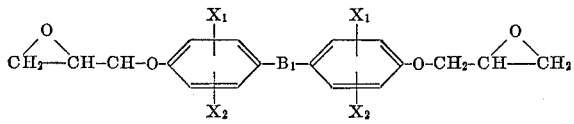

in which A is a nuclearly attached monovalent radical having two, three or four fused rings, each ring consisting of five carbon atoms connected by single bonds and in which $B_1$ is a nuclearly attached divalent radical having three or four fused rings, each ring consisting of five carbon atoms connected by single bonds and $X_1$ and $X_2$ are each hydrogen, methyl or halogen.

Also, there are provided new synthetic resinous polyethers composed essentially of recurring units derived from at least one of the above compounds and which may include copolymers wherein the comonomer is a known bisphenol or bifunctional glycol. The copolymers can be random or block copolymers.

This application is a continuation-in-part of our co-pending application Ser. No. 480,774 filed on Aug. 18, 1965, which is a continuation-in-part of our Ser. No. 93,866, filed Mar. 7, 1961, now U.S. Patent No. 3,298,998 granted Jan. 17, 1967.

This invention relates to certain new bis[p-(2,3-epoxy-propoxy)phenyl]polycyclic saturated hydrocarbons and synthetic resinous polyethers thereof. These compounds and polymers are derived from new bisphenols described in Jackson and Caldwell application Ser. No. 137,980 filed Sept. 14, 1961.

Polyethers derived from Bisphenol A and epichlorohydrin and having the structure

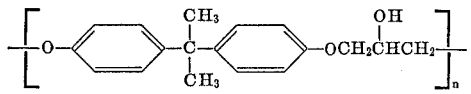

are known in the art. (Such polyethers are distinct from the so-called Epon resins which are of lower molecular weight, contain terminal epoxy groups and require chemical curing. The chemical curing causes cross-linking so that the Epon resins are not thermoplastic.) These compounds are useful in a wide variety of applications. Thus, they may be used for injection molding, extrusion and blow molding and for adhesives and coatings. The presence of secondary hydroxyl groups permits chemical cross-linking with such materials as isocyanates, anhydrides, etc., when resistance to solvents is desired. However, these polyethers suffer two major disadvantages, namely low softening point and flammability. Since such polyethers soften at about 100° C., molded objects made from them are deformed quite badly when an attempt is made to sterilize them with steam. Also, due to their high flammability, large amounts of antimony oxide and/or chlorinated compounds must be blended with such resins to provide some degree of flame resistance. This is itself disadvantageous since the presence of antimony and chlorine compounds cause stability problems, embrittle the resin and render it opaque.

It is an object of this invention to provide certain new bis[p-(2,3-epoxypropoxy)phenyl]polycyclic saturated hydrocarbons and synthetic resinous polyethers thereof.

It is another object of this invention to provide thermoplastic polyether resins having high stiffness, good clarity, a heat distortion temperature sufficiently high to permit steam sterilization of molded objects, and flame resistance.

These, and other objects, are attained by the practice of this invention which, briefly, comprises providing a high melting, high molecular weight polyether composed essentially of recurring units having the formula $$-CH_2\overset{|}{\underset{OH}{C}}HCH_2O-X-O-$$

in which at least 10 mole percent of the radical —X— is the divalent radical remaining after removal of the terminal hydroxyl groups from a bisphenol having the formula

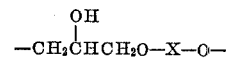

in which A is a non-aromatic, polycarbocyclic group having five carbon atoms in each carbocyclic ring, m may be either 0 or 1 and $X^1$ and $X^2$ are members selected from the group consisting of hydrogen, methyl and halogen and not more than 90 mole percent of the radical —X— is the divalent radical remaining after the removal of the terminal hydroxyl groups from a different dihydroxy substituted compound.

In the above formula defining the bisphenols, A may be, for example, the norcamphanylidene group

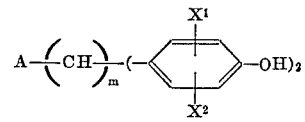

the hexahydro-4,7-methanoindanylidene group

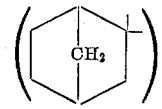

the hexahydro-4,7-methanoindanylmethylene groups

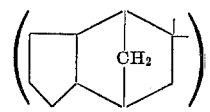

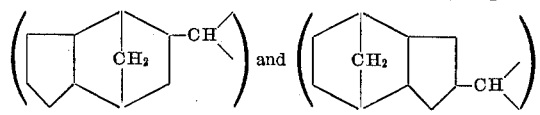

the methylnorcamphanylmethylene groups

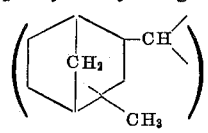

the decahydro-1,4,5,8-dimethanonaphthylidene group

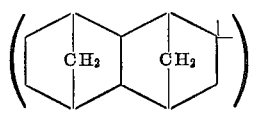

The novel compounds of this invention may be prepared by reacting a diglycidyl ether of one of the previously described bisphenols with a bisphenol. Such a reaction is exemplified by the following equation:

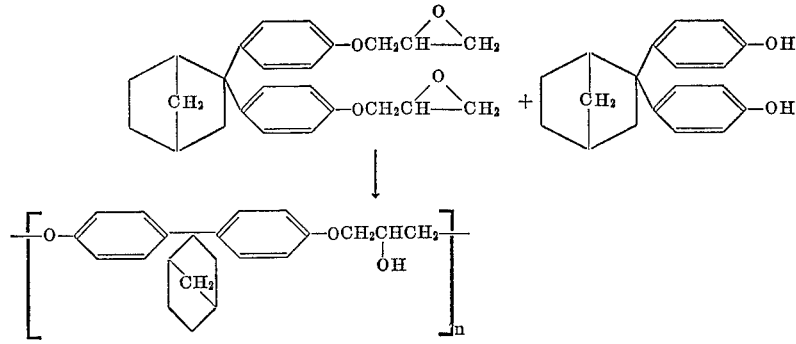

or the decahydro-1,4,5,8-dimethanonaphthylmethylene group

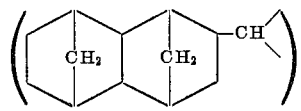

Alternatively, the polyethers of this invention may be prepared by reacting the bisphenol with epichlorohydrin in the presence of a base. Such a reaction is illustrated by the following equation:

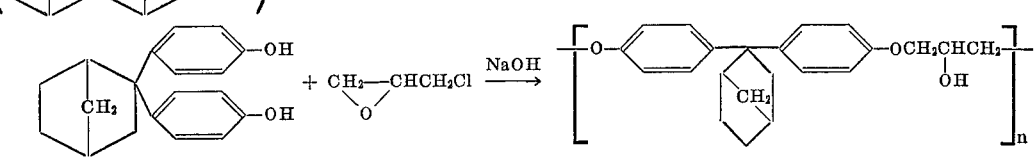

Copolyethers may be prepared for example, by reacting one of the bisphenols with a diglycidyl ether of a different dihydroxy compound as illustrated below:

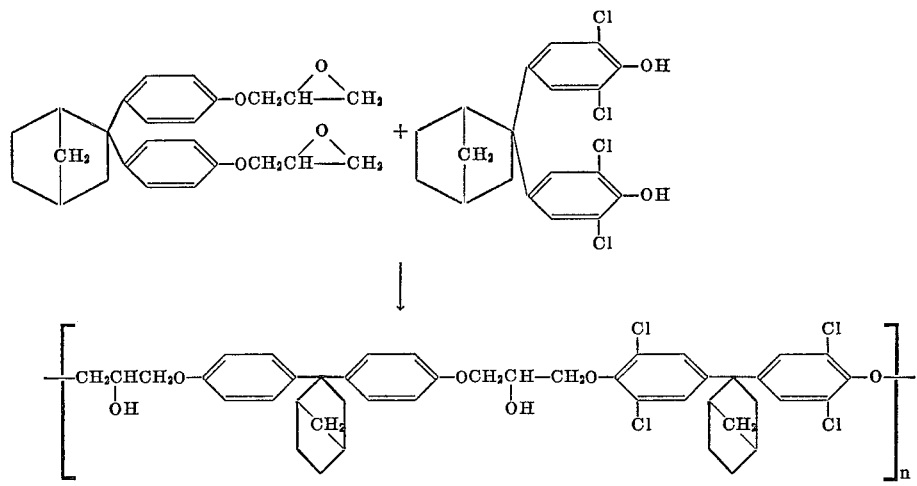

and

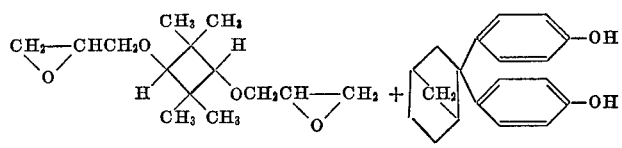

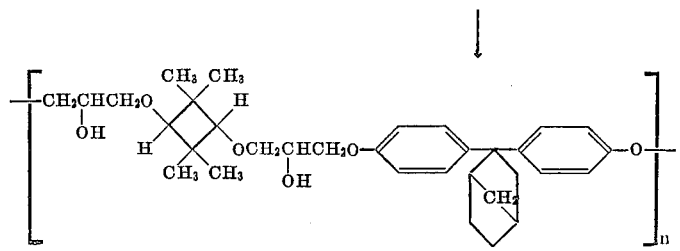

The reactions may be conducted either in the presence or absence of inert solvents. Operable reaction temperatures range from about 25° C. to about 300° C. while the preferred reaction temperatures include 25° C. to about 225° C. The reactions are base catalyzed and typical catalysts include sodium phenoxide, potassium phenoxide, lithium phenoxide, sodium methoxide, potassium methoxide, lithium methoxide, sodium isobutoxide, aluminum isopropoxide, lithium amide, tributylamine, sodium hydroxide, sodium silicate, etc.

Some examples of bisphenols as defined by the above formula which may be incorporated into the polyethers of this invention include:

4,4'-(2-norcamphanylidene) diphenol, M.P. 140–190° C. (The M.P. depends on the rate of heating and loss of water of hydration.)
4,4'-(hexahydro-4,7-methanoindan-5-ylidene) diphenol monohydrate, M.P. 221–223° C.
4,4'-(hexahydro-4,7-methanoindan-5-ylidene) di-o-cresol, M.P. 208–210° C.
4,4'-(3-methylnorcamphan-2-ylmethylene) diphenol, M.P. 222–224° C.

Other bisphenols falling within the category represented by the above structural formula and useful for incorporation into the new polyethers of this invention are:

4,4'-(hexahydro-4,7-methanoindan-5-ylidene) di-m-cresol
4,4'-(3-methylnorcamphan-2-ylmethylene) di-o-cresol
4,4'-(2-methylnorcamphan-2-ylmethylene) diphenol
4,4'-(2-methylnorcamphan-2-ylmethylene) di-o-cresol
4,4'-(3-methyl-2-norcamphanylidene) diphenol
4,4'-(3-methyl-2-norcamphanylidene) di-o-cresol
4,4'-(2-norcamphanylidene) di-o-cresol
4,4'-(decahydro-1,4,5,8-dimethanonapth-2-ylmethylene) diphenol
4,4'-(decahydro-1,4,5,8-dimethanonaphth-2-ylmethylene) di-o-cresol
4,4'-(decahydro-1,4,5,8-dimethanonaphth-2-ylidene) diphenol
4,4'-(decahydro-1,4,5,8-dimethanonaphth-2-ylidene) di-o-cresol
4,4'-(hexahydro-4,7-methanoindan-2-ylmethylene) diphenol
4,4'-(hexahydro-4,7-methanoindan-2-ylmethylene) di-o-cresol
4,4'-(hexahydro-4,7-methanoindan-2-ylidene) diphenol
4,4'-(hexahydro-4,7-methanoindan-2-ylidene) di-o-cresol Such bisphenols are readily prepared in 70–90% yields by treating the appropriate ketone or aldehyde with phenol or cresol in the presence of hydrochloric acid and beta-mercaptopropionic acid. The preparation of a typical compound, 4,4'-(2-norcamphanylidene) diphenol, will serve to illustrate the general procedure which may be employed for preparing any of the above-mentioned bisphenols.

A mixture containing 55 g. (0.50 mole) of norcamphor, 188 g. (2.0 moles) of phenol, 125 g. of concentrated hydrochloric acid, and 2.5 g. of beta-mercaptopropionic acid was stirred at 25° C. for 48 hours. The lower aqueous layer was decanted from the upper semisolid organic layer. The organic layer was washed twice with 500 ml. of hot water (70–80° C.) to remove the excess phenol. The crude yield was 127–140 g. (85–94% calculated as the monohydrate). The crude bisphenol melted in the 140–190° C. range depending upon the rate of heating and loss of water of hydration. The compound 4,4'-(2-norcamphanylidene) diphenol, can be recrystallized from mixtures of acetic acid and water, or isopropanol and water.

When a diglycidyl ether of one of the above-mentioned bisphenols is to be used as one of the starting materials for the preparation of the polyethers of this invention, it may be prepared by treating the bisphenol with epichlorohydrin or epibromohydrin in the presence of sodium hydroxide. This reaction may be illustrated by the following equation in which 4,4'-(2-norcamphanylidene) bisphenol is reacted with epichlorohydrin to give 2,2-bis-[p-(2,3-epoxypropoxy)phenyl]norcamphane.

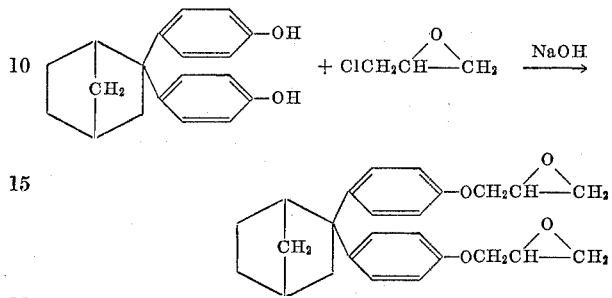

In carrying out this reaction, it is preferable to employ a slight excess of epichlorohydrin or epibromohydrin although stoichiometric amounts of the reagents may be employed if desired. The reaction can be effected at a temperature of 25 to 125° C., and continued for a period of 1 to 8 hrs. Although solvents are not required for this reaction, various inert solvents such as diethyl ether, dibutyl ether, toluene, xylene, benzene, esters such as ethyl acetate, butyl acetate, isobutyl acetate, ethyl isobutyrate and isobutyl isobutyrate may be employed if desired. The advantage to be obtained by the employment of such solvents is merely a fluid reaction mixture.

Described below are some preparations of diglycidyl ethers of bisphenols, which compounds may be used as one of the starting materials for the preparation of the polyethers of this invention:

Preparation of 2,2-bis[p-(2,3-epoxypropoxy)phenyl] norcamphane

Epichlorohydrin (37 g., .4 mole), 4,4'-(2-norcamphylidene) diphenol monohydrate (29.8 g., .1 mole) were placed in a 300 ml. flask and stirred with a high-speed stirrer. The reaction mixture was heated to 70° and 16 g. of a 50% sodium hydroxide solution was added dropwise over a 20-minute period. The reaction was exothermic and the temperature rose to 95° C. for a short period of time. Ten ml. of water was added and then the reaction mixture was heated for 3½ hr. in the 70–90° C. range. After cooling the reaction mixture, 200 ml. of ether was added and stirred well. The aqueous solution was drained off and the ether solution was washed three times with water. After drying the ether solution over sodium sulfate, the ether was stripped off on the steam bath at atmospheric pressure. Finally, the product was stripped in vacuo to a pot temperature of 50° C. and a pressure of 2 mm. The product is an extremely viscous, straw-colored material and amounted to 41.4 g. It had an oxirane oxygen content of 6.2%.

Preparation of 5,5-bis[p-(2,3-epoxypropoxy)phenyl] hexahydro-4,7-methanoindane

This extremely viscous product was prepared from 4,4'-(hexahydro - 4,7 - methanoindan-5-ylidene)diphenol, epichlorohydrin and aqueous sodium hydromide, according to the previously described procedure. It had an oxirane oxygen content of 6.7%.

Preparation of 2,2-bis[4-(2,3-epoxypropoxy)-3-methylphenyl]hexahydro-4,7-methanoindane This diepoxide was prepared from 4,4'-(hexahydro-4,7-methanoindan-5-ylidene)di-o-cresol, epibromohydrin, and aqueous potassium hydroxide according to the previously described procedure. The oxirane oxygen content was 5.9%.

Preparation of 2-bis[p-(2,3-epoxypropoxy)phenyl]
methylene-3-methylnorcamphane

This viscous material was prepared from 4,4'-(3-methylnorcamphan-2-ylmethylene)diphenol, epichlorohydrin and aqueous sodium hydroxide according to the previously described procedure. The oxirane oxygen content was 6.8%.

As previously mentioned, copolyethers may be prepared by reacting one of the previously described bisphenols with a diglycidyl ether of a different dihydroxy compound. If the different dihydroxy compound is not one of the bisphenols previously described, then it should comprise no more than 90 mole percent, and preferably no more than 75 mole percent, of the total amount of dihydroxy reactant, and the bisphenol previously described should comprise at least 10 mole percent, and preferably at least 25 mole percent, of this total.

Examples of other dihydroxy compounds which may be incorporated into the polyethers of this invention include Bisphenol A, hydroquinone and various glycols. The diglycidyl ethers of these compounds may be reacted with one of the previously described bisphenols.

Aliphatic or glycol diglycidyl ethers may be prepared by epoxidizing diallyl ethers of saturated hydrocarbon glycols in which the hydroxy groups are separated by more than two carbon atoms by treatment with an epoxidizing agent such as peracetic acid, hydrogen peroxide, performic acid or hypochlorous acid. Described below are the preparations of some aliphatic diglycidyl ethers which may be used in the preparation of copolyethers included in this invention:

Preparation of 1,4-bis(2,3-epoxypropoxymethyl)
cyclohexane 1,4-bis(allyloxymethyl)cyclohexane (0.5 mole) and sodium acetate (0.5 mole) were placed in 300 ml. of chloroform and stirred while peracetic acid (1.2 mole) (40% peracetic acid in acetic acid) was added dropwise. The reaction was exothermic and the temperature rose to about 60° C. Then the reaction mixture was stirred for four hours at 25° C. After diluting the reaction mixture with water, it was extracted with diethyl ether. The ether solution was washed with saturated sodium thiosulfate solution and then again with water. After drying the organic solution over sodium sulfate, the solvents were removed by distillation at atmospheric pressure. Finally, the product was stripped in vacuo (1 mm.) leaving the product as a transparent viscous oil. The oxirane oxygen content of this compound was 11.4%.

Preparation of 1,3-bis(2,3-epoxypropoxy)-2,2-
dimethylpropane

This viscous oil was prepared from 1,3-bis(allyloxy)-2,2-dimethylpropane and peracetic acid according to the previous procedure. The oxirane oxygen content of this compound was 13.5%.

Preparation of 1,3-bis(2,3-epoxypropoxy)2,2,4,4-
tetramethylcyclobutane

This compound was prepared from 1,3-diallyloxy-2,2,4,4-tetramethylcyclobutane and peracetic acid according to the previous procedure. The oxirane oxygen content of this compound was 10.9%.

Preparation of 1,3-bis(2,3-epoxypropoxy)-2,2,4-
trimethylpentane

This compound was prepared from 1,3-diallyloxy-2,2,4-trimethylpentane and peracetic acid according to the previous procedure. The oxirane oxygen content of this compound was 10.2%.

Preparation of 2,5-(or 6-)bis(2,3-epoxypropoxymethyl)
norcamphane

This viscous transparent oil was prepared from 2,5-(or 6-)bis(allyloxymethyl)norcamphane and peracetic acid according to the previous procedure. The oxirane oxygen content of this compound was 10.3%.

Preparation of 1,4-bis(2,3-epoxy-2-methylpropoxymethyl)-cyclohexane

This compound was prepared from 1,4-bis(methallyloxymethyl) cyclohexane and peracetic acid according to the previous procedure. The oxirane oxygen content of this compound was 9.6%.

The polymers of this invention are characterized by high softening points which permit molded objects made from the polymers to be steam sterilized without distortion of the object. They may be prepared having varying molecular weights. In order to produce molded objects with good physical properties, polymers with molecular weights greater than 10,000 are desirable and molecular weights of 20,000 to 50,000 or even higher such as 100,000 are preferred.

The polyethers of this invention may be processed into molded objects by conventional injection molding, compression molding or extrusion techniques. Prior to molding, conventional stabilizers, anti-oxidants, plasticizers, pigments, etc., may be incorporated into the polyethers.

The following examples illustrate the best modes contemplated for carrying out this invention:

EXAMPLE 1

2,2 - bis[p - (2,3 - epoxypropoxy)phenyl]norcamphane (0.02 mole), 4,4'-(2-norcamphanylidene)diphenol (0.021 mole) and sodium phenoxide (0.01 g.) were reacted at 150° C. with stirring under an atmosphere of $N_2$ for 1 hr. The temperature was gradually raised to 190–200° C. and maintained there for 0.5 hr. The polymer melt was clear and extremely viscous. The softening point of the polymer was 180–200° C. and it had a melt flow of 0.4 (determined at 230° C./2.16 kg. weight). The resulting product was composed essentially of recurring ether units having the formula:

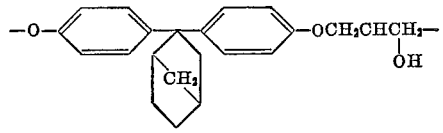

Buttons compression molded from the polymer were clear, hard and extremely stiff.

EXAMPLE 2

A polyether having the same structure and properties was prepared by treating 4,4'-(2-norcamphanylidene)diphenol with an equimolar amount of epichlorohydrin in the presence of aqueous sodium hydroxide.

EXAMPLE 3

2,2 - bis[3,5 - dichloro - 4 - (2,3-epoxypropoxy)phenyl]norcamphane, M.P. 158–162° C. (0.03 mole), and 4,4' - (2 - norcamphanylidene)bis[2,6 - dichlorophenol] 0.0.031 mole) were reacted according to the general procedure of Example 1 except that sodium methoxide was the catalyst and the final reaction temperature was 225° C. A compression molded plate was hard, stiff and quite flame resistant. The softening point of this polymer was about 220–240° C. It was composed essentially of recurring units having the formula:

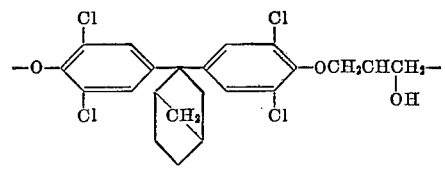

EXAMPLE 4

By the process described in Example 1, 2,2-bis[p-(2,3-epoxypropoxy)phenyl]norcamphane) 0.02 mole) and 4,4' - (2-norcamphanylidene)bis[2,6-dichlorophenol] (0.02 mole) were reacted using potassium phenoxide as the catalyst. Specimens molded from the product were clear, hard and flame resistant. The product was composed essentially of recurring units having the formula:

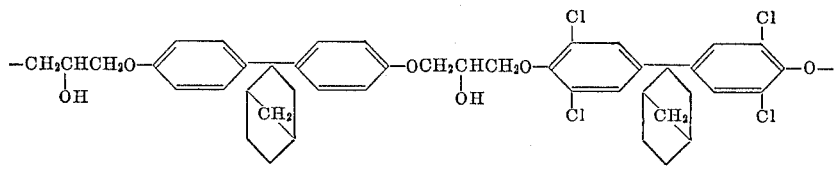

EXAMPLE 5

By the process described in Example 4, 2,2-bis[p-(2,3-epoxypropoxy)phenyl]norcamphane (0.02 mole), 4,4'-(2-norcamphanylidene)diphenol (0.01 mole) and 4,4' - (2-norcamphanylidene)bis[2,6-dichlorophenol] (0.01 mole) were reacted to obtain a high melting, flame resistant copolymer.

EXAMPLE 6

By the process described in Example 1, 1,3 - bis(2, 3 - epoxypropoxy)2,2,4,4 - tetramethylcyclobutane (0.04 mole) and 4,4' - (2 - norcamphanylidene) diphenol (0.04 mole) were reacted to obtain a high melting copolymer composed essentially of recurring units having the formula:

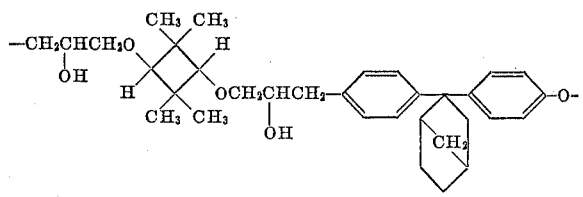

EXAMPLE 7

A series of high melting copolymers were prepared by repeating the process of Example 6 substituting for the 1,3 - bis(2,3 - epoxypropoxy)2,2,4,4 - tetramethylcyclobutane equimolar amounts of each of the following:

1,3-bis(2,3-epoxypropoxy)-2,2-dimethylpropane,
1,4-bis(2,3-epoxypropoxymethyl)cyclohexane,
1,3-bis(2,3-epoxypropoxy)-2,2,4-trimethylpentane and
2,5-bis(2,3-epoxypropoxymethyl)norcamphane.

EXAMPLE 8

A series of flame resistant copolymers were prepared by repeating the processes of Examples 6 and 7 substituting for the 4,4' - (2 - norcamphanylidene) diphenol equimolar amounts of each of the following:

4,4'-(2-norcamphanylidene)bis[2,6-dichlorophenol] and
4,4'-(2-norcamphanylidene)bis[2,6-dibromophenol]

EXAMPLE 9

2,2-bis[p - (2,3 - epoxypropoxy)phenyl] norcamphane (0.05 mole), 4,4'-(2-norcamphanylidene) diphenol (0.04 mole) and sodium phenoxide 0.01 g.) were reacted at 150° C. with stirring under an atmosphere of N₂ for 1 hr. Then, 5,5-bis[p-2,3-epoxypropoxy)phenyl]hexahydro-4,7-methanoindane (0.005 mole) and 4,4'-hexahydro-4,7-methanoindan - 5 - ylidene) diphenol (0.005 mole) were added and the reaction was completed at 210° C. A molded button from this copolymer was stiff and hard.

The product was a block copolymer containing structural units having the formula:

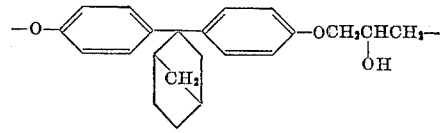

and

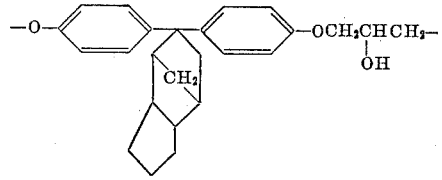

EXAMPLE 10

A 1-liter, 3-necked flask was charged with the following:

Bisphenol A (0.375 mole; 87.65 g.),
4,4'-(2-norbornylidene)diphenol hydrate (0.125 mole; 37 g.),
epichlorohydrin (0.5 mole; 46.2 g.),
ethanol (128 g.),
sodium hydroxide (20 g.) and
water (80 g.).

The mixture was stirred overnight at room temperature, a solution of 3 g. of NaOH in 12 ml. of water was added and the mixture was brought to reflux. Monochlorobenzene was added to the refluxing mixture, 30 ml. after 30 minutes reflux, 15 ml. additional after 45 minutes reflux and an additional 15 ml. after 60 minutes reflux. The mixture was then refluxed for 4 hours and a mixture of 4.8 g. of phenol dissolved in 30 ml. of monochlorobenzene was added. After an additional 2 hours reflux, the reaction mixture was washed with 3 200-ml. portions of water. Then, 200 ml. chloroform and a solution of 10 ml. of 85% H₃PO₄ in 50 ml. of water was added. This mixture was then washed with 8 200-ml. portions of water. The resulting viscous product was heated in a vacuum oven to remove most of the solvent and the residue was dissolved in dioxane. This solution was precipitated into cold water and the white product was dried in an air oven. The final product weighed 144 g. (94% yield) and had a melt flow of 23. The plastic was clear and flexible and had a melting point of 168–175° C. The product was a copolymer containing 75 mole percent of Bisphenol A and 25 mole percent of 4,4'-(2-norbornylidene) diphenol.

EXAMPLE 11

2,2-bis[p-(2,3-epoxypropoxy) phenyl] norcamphane (0.05 mole), 4,4'-(norcamphanylidene)diphenol (0.04 mole) and sodium isobutoxide (0.01 g.) are reacted at 150° C. with stirring under an atmosphere of N₂ for 1 hr. Then 4,4'-(2-norcamphanylidene)bis[2,6-dichlorophenol] (0.01 mole) and 2,2-bis[3,5-dichloro-4-(2,3-epoxypropoxy)phenyl]norcamphane (0.01 mole) are added and the reaction is completed at 210° C. This block copolymer contains structural units having the formula:

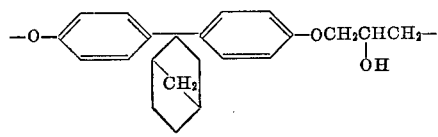

and

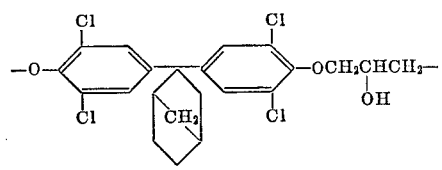

It is readily molded into buttons and plates which are flame resistant.

EXAMPLE 12

2-bis[p-(2,3-epoxypropoxy)phenyl]methylene 3-methylnorcamphane (0.1 mole), 4,4'-3-methylnorcamphane-2-ylmethylene)diphenol (0.09 mole) and sodium methoxide (0.01 g.) are reacted at 155° C. with stirring under an amtosphere of N₂ for 1 hr. Then 2,2,4,4-tetramethylcyclobutanediol (0.02 mole) and 1,3-bis(2,3-epoxypropoxy-2,2,4,4-tetramethylcyclobutane (0.02 mole) are added and the reaction is completed at 215° C. This block copolymer contains structural units having the formula:

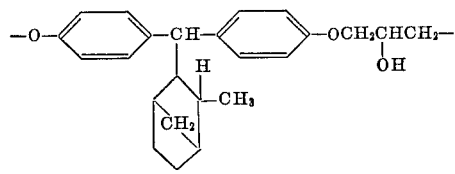

and

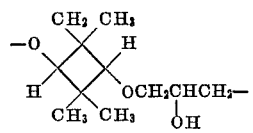

EXAMPLE 13

5,5 - bis[p - (2,3-epoxypropoxy)phenyl]hexahydro-4,7-methanoindane (0.1 mole), 4,4'-(hexahydro-4,7-methanoindan-5-ylidene)diphenol (0.1 mole) and sodium phenoxide (0.02 g.) are reacted at 150° C. with stirring under an atmosphere of N₂ for 1 hr. Then Bisphenol A (0.02 mole) and 2,2-bis[p-(2,3-epoxypropoxy)phenyl]propane (0.02 mole) are added and the reaction is completed at 210° C. This block copolymer contains structural units having the formula:

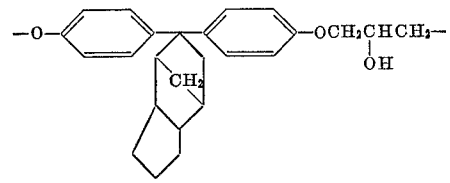

and

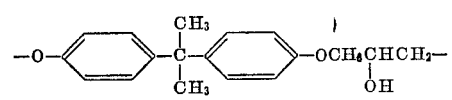

It is readily compression molded into buttons.

EXAMPLE 14

2,2 - bis[p - (2,3 - epoxypropoxy)phenyl]norcamphane (0.1 mole), 4,4'-(2-norcamphanylidene)diphenol (0.1 mole), and sodium phenoxide (0.02 g.) are reacted at 150° C. with stirring under an atmosphere of N₂ for 1 hr. Then 4,4' - (decahydro-1,4,5,8-dimethanonaphthylidene) diphenol (0.04 mole) and 2,2-bis[p-(2,3-epoxypropoxy)phenyl]decahydro - 1,4,5,8-dimethanonaphthalene (0.04 mole) are added and the reaction is completed at 220° C. This block copolymer contains structural units having the formula:

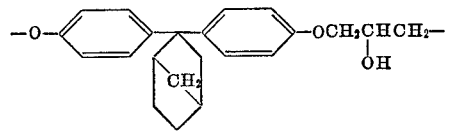

and

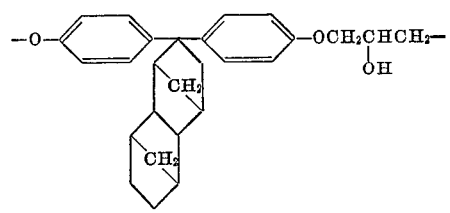

It is readily molded into buttons and plates.

EXAMPLE 15

2,2 - bis[p - (2,3-epoxypropoxy)phenyl]norcamphane (0.1 mole), 4,4'-(2-norcamphanylidene)diphenol (0.1 mole) and sodium phenoxide (0.01 g.) are reacted at 150° C. with stirring under an atmosphere of N₂ for 1 hr. Then 4,4'-(2-norcamphanylidene)bis[2,6-dibromophenol] (0.015 mole) and 2,2-bis[3,5-dibromo-4-(2,3-epoxypropoxy)phenyl]norcamphane (0.015 mole) are added and the reaction is completed at 215° C. This block copolymer contains structural units having the formula:

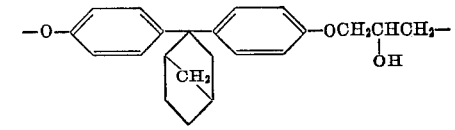

and

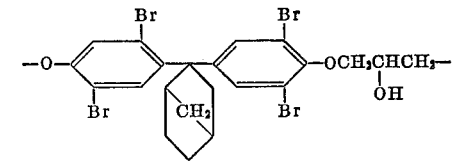

Although the invention has been described in considerable detail with particular reference to certain preferred embodiments thereof, variations and modifications can be effected within the spirit and scope of the invention as described hereinabove, and as defined in the appended claims.

We claim:
1. A compound having the formula:

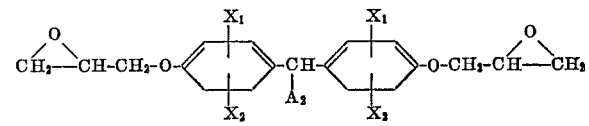

or the formula:

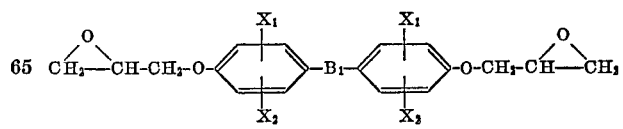

in which A₂ is a nuclearly attached monovalent radical having two, three or four fused rings, each ring consisting of five carbon atoms connected by single bonds and in which B₁ is a nuclearly attached divalent radical having three or four fused rings, each ring consisting of five carbon atoms connected by single bonds and $X_1$ and $X_2$ are each hydrogen, methyl or halogen.

2. A compound as defined by claim 1 which is 5,5-bis [p-(2,3-epoxypropoxy)phenyl]hexahydro-4,7 - methanoindane.

3. A compound as defined by claim 1 which is 2,2-bis [4-(2,3-expoxypropoxy)-3-methylphenyl]hexahydro - 4,-7-methanoindane.

4. A compound as defined by claim 1 which is 2-bis [p - (2,3 - epoxypropoxy)phenyl]methylene-3-methylnorcamphane.

5. A synthetic resinous polyether composed essentially of recurring units having the formula:

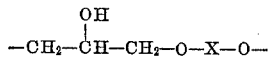

in which from about 10 to 100 mole percent of the radical X is the divalent radical remaining after the removal of the terminal hydroxyl groups from a bisphenol having the formula:

(I) 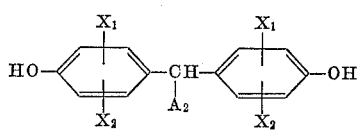

or the formula:

(II) 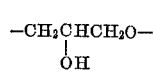

in which $A_2$ is a nuclearly attached monovalent radical having two, three or four fused rings, each ring consisting of five carbon atoms connected by single bonds and in which $B_2$ is a nuclearly attached divalent radical having two, three or four fused rings, each ring consisting of five carbon atoms connected by single bonds
and $X_1$ and $X_2$ are each hydrogen, methyl or halogen and from zero to 90 mole percent of the radical X is a bifunctional glycol, a dihydroxybenzene or a bisphenol having the formula:

(III) 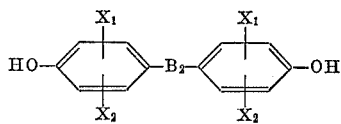

in which $R_1$ and $R_2$ when taken collectively with the connecting carbon atom C are cyclohexyl or methyl- or halogen- substituted cyclohexyl, and when $R_1$ and $R_2$ are taken separately are hydrogen, lower alkyl, cyclohexyl, methyl- or halogen- substituted cyclohexyl, phenyl, methyl- or halogen- substituted phenyl, and $X_1$ and $X_2$ are defined above.

6. A polyether as defined by claim 5 in which $A_2$ is a radical selected from the group consisting of norcamphanylidene, hexahydro-4,7-methanoindanylidene, hexahydro - 4,7 - methanoindanylmethylene, methylnorcamphanylmethylene, decahydro - 1,4,5,8 - dimethanonaphthylidene and decahydro - 1,4,5,8 - dimethanonaphthylmethylene groups.

7. A polyether as defined by claim 5 wherein 25 mole percent of the radical X is the divalent radical remaining after the removal of the terminal hydroxyl groups from 4,4'-(2-norbornylidene) diphenol and 75 mole percent of the radical X is the divalent radical remaining after the removal of the terminal hydroxyl groups from 2,2'-bis(4-hydroxyphenyl) propane.

8. A polyether as defined by claim 5 composed essentially of recurring units having the formula:

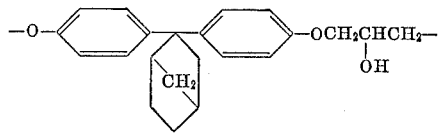

9. A polyether as defined by claim 5 composed essentially of recurring units having the formula:

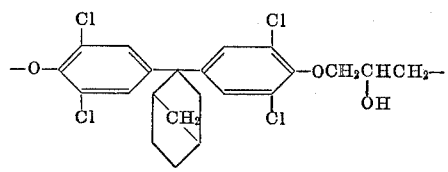

10. A polyether as defined by claim 5 composed essentially of recurring units having the formula:

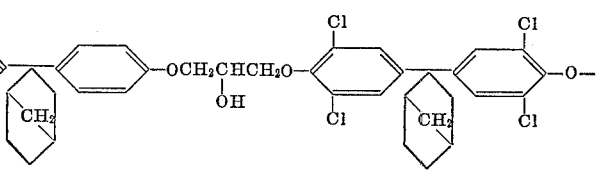

11. A polyether as defined by claim 5 composed essentially of recurring units having the formula:

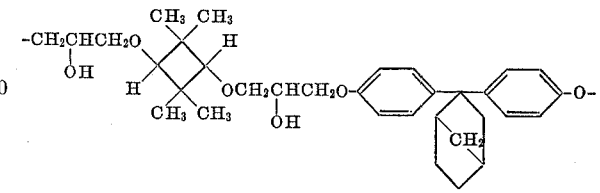

12. A synthetic resinous polyether as defined by claim 5 which is a block copolymer of from 50 to 90 mole percent of blocks wherein radical X is derived from Formula I or II and 10 to 50 mole percent of blocks wherein radical X is derived from a bifunctional glycol, a dihydroxybenzene or a bisphenol of Formula III.

13. A polyether as defined by claim 12 composed essentially of recurring units having the formulas:

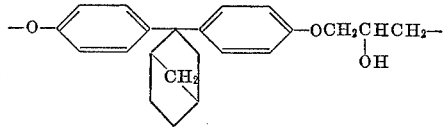

and

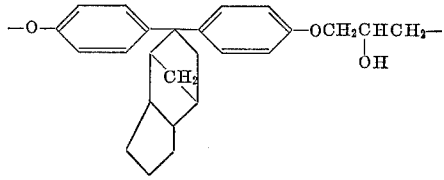

References Cited

UNITED STATES PATENTS 3,305,528   2/1967   Wynstra et al.
3,306,872   2/1967   Maycock et al.

WILLIAM H. SHORT, *Primary Examiner.*

T. D. KERWIN, *Assistant Examiner.*